Patented Dec. 28, 1948

2,457,738

UNITED STATES PATENT OFFICE 2,457,738

THERMOPLASTIC AMINOPLASTS

Milton J. Scott, Springfield, Mass., assignor to Monsanto Chemical Company, St. Louis, Mo., a corporation of Delaware No Drawing. Application April 2, 1946, Serial No. 659,157

9 Claims. (Cl. 260—45.1)

This invention relates to synthetic resins. More particularly the invention relates to modified melamine resins.

The known melamine resins are essentially thermosetting in nature and will cure under heat to an insoluble, infusible state in the presence of either acid or alkaline curing catalysts. As a result, great care must be taken in preparing melamine resins to prevent the premature development of the insoluble, infusible state.

An object of this invention is to provide new synthetic resins.

A further object of this invention is to provide thermoplastic melamine resins.

Another object is to provide modified melamine resins which are essentially thermoplastic but may be made thermosetting.

These and other objects are attained by reacting a dialkylol melamine with a para substituted phenol.

The following examples are given in illustration and are not intended to limit the scope of this invention. Where parts are mentioned they are parts by weight.

Example I 190 parts (1 mol) of essentially anhydrous dimethylol melamine were stirred into 170 parts (1 mol) of molten p-phenyl phenol. Water split out during the reaction and was removed by vacuum distillation. A clear, colorless brittle thermoplastic resin was obtained which could be molded by any of the conventional methods such as compression or injection molding and could be made into a thermosetting resin by the addition of paraformaldehyde.

Example II 190 parts (1 mol) of essentially anhydrous dimethylol melamine were stirred into 150 parts (1 mol) of molten p-tertiary butyl phenol and the water produced by the reaction removed by distillation. A clear thermoplastic resin was obtained which could be injection or compression molded and which could be made thermosetting by the addition of formaldehyde.

Dimethylol melamine is made by heating 1 mol of melamine with 2 mols of formaldehyde—preferably in the form of the water solution known as Formalin which contains about 37% formaldehyde by weight—at a pH of approximately 8.3 until a clear solution is obtained. The dimethylol melamine may then be freed of water and used in the essentially anhydrous form as shown in Examples I and II or it may be used as an aqueous solution and reacted directly with a para substituted phenol.

Example III

A mixture of 126 parts of melamine (1 mol) and 162 parts of commercial Formalin (2 mols) were adjusted to a pH of 8.3 (glass electrode) with sodium hydroxide. The slurry was heated under reflux at atmospheric pressure until solution was complete. Then 108 parts (1 mol) of p-cresol were added with vigorous agitation to develop a dispersion. This dispersion was refluxed for one hour at atmospheric pressure after which the water was removed by distillation. A clear permanently fusible resin was obtained which could be made thermosetting by addition of formaldehyde releasing materials.

The dimethylol melamine may be replaced by other dialkylol melamines made by reacting melamine with aliphatic, aromatic or alicyclic saturated or unsaturated aldehydes such as acetaldehyde, propionaldehyde, butyraldehyde, hexaldehyde, octaldehyde, acrolein, benzaldehyde, cinnamaldehyde, furfuraldehyde, etc. When lower aliphatic aldehydes are used, it is sufficient to heat the two reactants at a pH of from about 8.0 to about 9.0 until a clear solution is obtained. The higher aliphatic aldehydes and aromatic aldehydes may require a longer heating under refluxing conditions at atmospheric pressure to complete the reaction between the aldehyde and the melamine. In all cases, about 1 mol of melamine is reacted with about 2 mols of aldehyde preferably in the presence of water. Although refluxing at atmospheric pressure is generally preferred, the reaction may be carried out at other pressures either below or above atmospheric with consequent changes in the time and temperature necessary to complete the reaction.

The para substituted phenols of this invention are phenols having an alkyl, aryl or aralkyl group in the para position e. g., p-cresol, p-ethyl phenol, p-propyl phenol, p-butyl phenol, p-isobutyl phenol, p-tertiary butyl phenol, the p-amyl phenols, p-phenyl phenol, p-phenethyl phenol, p-cyclohexyl phenol, etc.

The reaction between the dialkylol melamine and the para substituted phenol may be conducted under substantially anhydrous condition as shown in Examples I and II or an aqueous solution or suspension of the dialkylol melamine may be reacted with the p-substituted phenol as shown in Example III. Water formed during the reaction and present in the original reactants separates from the final reaction product which is not soluble in water and may be removed by partial decantation followed by distillation, by distillation alone or by other conventional methods. The molar ratio of dialkylol melamine to para substituted phenol should be maintained at substantially 1:1 to avoid production of undesired by-products.

The resins thus produced are insoluble in water and most organic solvents although they may be swollen and partially dissolved in hot ethanol. They are clear thermoplastic resins ranging from brittle to tough in physical properties depending on the nature of the para substituent. The thermoplastic nature of the resins may be attributed to the building up of long chains in which a melamine group alternates regularly with a para substituted phenol group.

The resins may be molded by conventional methods for molding thermoplastic resins, e. g., compression, injection, transfer molding, etc. They may be compounded with conventional molding powder additives such as natural and synthetic resins, fillers, plasticizers, dyes, pigments, etc.

If a thermosetting resin is desired, the thermoplastic resins may be compounded with up to about 10% by weight of an aldehyde or aldehyde producing compound such as formaldehyde, acetaldehyde, paraformaldehyde, paraldehyde, trioxymethylene, hexamethylene tetramine, benzaldehyde, cinnamaldehyde, acrolein, furfural, crotonaldehyde, etc. The compounded resin may then be thermoset by heating to at least 200° F. with or without the addition of acid or basic curing catalysts.

If desired the thermoplastic resins may also be modified by reaction with an aldehyde and an alcohol to form an ether.

*Example IV*

1 mol of a resin made according to Example II was refluxed under atmospheric conditions with 4 mols of formaldehyde (preferably in the form of the aqueous solution known as Formalin) and 6 mols of butanol in the presence of a small amount of methyl phosphoric acid catalyst. Water was removed by azeotropic distillation. Anhydrous butanol was added during the distillation until a water-free butanol solution of the etherified resin was obtained. The etherified resin obtained by removal of the butanol was a clear liquid which could be cured to an insoluble and infusible resin by heating at temperatures above 200° F. without the addition of a curing catalyst. Faster curing at lower temperatures may be attained by using an acid or basic curing catalyst with attendant slight impairment of physical properties.

Instead of butanol, other alcohols may be used including aliphatic, aromatic, aralkyl, cyclic and alicyclic saturated or unsaturated alcohols, e. g., methanol, ethanol, propanol, 2-ethyl hexanol, lauryl alcohol, cetyl alcohol, stearyl alcohol, allyl alcohols, benzyl alcohol, cyclohexanol, furyl alcohol, etc. It is advantageous to use an excess of the alcohol above that required for the reaction, to act as a solvent for the resin produced.

The formaldehyde shown in Example IV may be replaced in whole or in part by aliphatic, aromatic, or alicyclic, saturated or unsaturated aldehydes. Up to 4 mols of aldehyde per mol of resin may be used.

The methyl phosphoric acid catalyst may be replaced by other acids such as hydrochloric, sulfuric, phosphoric, acetic, various sulfonic acids, etc. The amount of catalyst used will vary according to the strength of the acid and the temperature of the etherification reaction.

The etherified resins are clear liquids soluble in numerous organic solvents such as aliphatic and aromatic hydrocarbons, alcohols, ketones, esters, etc. They may be cured to insoluble, infusible resins by heating them to at least 200° F. with or without the addition of acid or basic curing catalysts. They may be used alone as coating compositions or they may be admixed with alkyd resins or oil-soluble phenol-formaldehyde-drying oil varnishes. Further they may be heated with drying oils such as linseed oil, tung oil, oiticica oil etc. to provide light colored coating compositions.

The resins of this invention have the particular advantage that they are thermoplastic and yet may be easily and simply converted into thermosetting resins. Thus, it is possible to make a preliminary resin without danger of obtaining an infusible gel which might set up in the reaction kettle. The thermoplastic resin may then be worked with fillers, pigments, dyes, until a satisfactory distribution of the various components is obtained without fear of advancing the resin past the moldable stage as is the case with thermosetting resins. The thermosetting agent may then be added to the compounded thermoplastic resin to obtain a molding powder which may be molded into articles of superior uniformity and toughness.

It is obvious that many variations may be made in the processes and products described above without departing from the spirit and scope of this invention as set forth in the appended claims.

What is claimed is:

1. A thermoplastic resin comprising the condensation product of one mol of a dialkylol melamine obtained by reaction of melamine and an aldehyde and substantially one mol of a para-substituted phenol in which the substituent is a member of the group consisting of organic alkyl, aryl and aralkyl radicals.

2. A thermoplastic resin as in claim 1 wherein the dialkylol melamine is dimethylol melamine.

3. A thermoplastic resin as in claim 2 wherein the para-substituted phenol is para phenyl phenol.

4. A thermoplastic resin as in claim 2 wherein the para-substituted phenol is para tertiary-butyl phenol.

5. A thermosetting composition comprising the reaction product of an aldehyde with the thermoplastic condensation product of one mol of a dialkylol melamine obtained by reaction of melamine and an aldehyde and substantially one mol of a para-substituted phenol in which the substituent is a member of the group consisting of organic alkyl, aryl and aralkyl radicals.

6. A thermosetting composition as in claim 5 wherein the dialkylol melamine is dimethylol melamine.

7. A thermosetting composition as in claim 6 wherein the para-substituted phenol is para phenyl phenol.

8. A thermosetting composition as in claim 6 wherein the para-substituted phenol is para tertiary-butyl phenol.

9. A coating composition comprising the reaction product of an aldehyde and a monohydric alcohol with the thermosetting condensation product of one mol of a dialkylol melamine obtained by reaction of melamine and an aldehyde with substantially one mol of para-substituted phenol in which the substituent is a member of the group consisting of organic alkyl, aryl and aralkyl radicals.

MILTON J. SCOTT.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,239,441 | D'Alelio | Apr. 22, 1941 |
| 2,315,400 | D'Alelio | Mar. 30, 1943 |
| 2,352,943 | D'Alelio et al. | July 4, 1944 |

FOREIGN PATENTS

| Number | Country | Date |
| --- | --- | --- |
| 409,397 | Great Britain | May 3, 1934 |
| 502,720 | Great Britain | Mar. 23, 1939 |